(12) United States Patent
Barajas Gonzalez et al.

(10) Patent No.: US 9,749,409 B2
(45) Date of Patent: Aug. 29, 2017

(54) PREDICTIVE DATA REPLICATION AND ACCELERATION (71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tuscon, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

(21) Appl. No.: 14/613,759

(22) Filed: Feb. 4, 2015

(65) Prior Publication Data

US 2016/0226971 A1 Aug. 4, 2016

(51) Int. Cl.
*G06F 15/16* (2006.01)
*H04L 29/08* (2006.01)
*H04L 12/24* (2006.01)

(52) U.S. Cl.
CPC ...... *H04L 67/1095* (2013.01); *H04L 67/1097* (2013.01); *H04L 41/147* (2013.01)

(58) Field of Classification Search
CPC  H04L 67/1095; H04L 67/1097; H04L 41/147
USPC ....................................................... 709/219
See application file for complete search history.

(56) References Cited

U.S. PATENT DOCUMENTS

| | | | | |
|---|---|---|---|---|
| 6,442,751 | B1* | 8/2002 | Cocchi ............... | G06F 8/437 707/999.202 |
| 7,539,745 | B1* | 5/2009 | Wang ................. | H04L 12/5695 709/214 |
| 8,238,243 | B2* | 8/2012 | Diaz .................. | H04L 47/10 370/232 |
| 8,380,960 | B2* | 2/2013 | Jia .................... | H04L 67/1097 709/214 |
| 2007/0185938 | A1* | 8/2007 | Prahlad ............. | G06F 17/30212 |
| 2007/0271431 | A1* | 11/2007 | Hwang .............. | G06F 11/1471 711/162 |
| 2008/0016121 | A1* | 1/2008 | Revah ............... | G06F 17/30138 |
| 2008/0282321 | A1* | 11/2008 | Hecht ................ | G06F 21/604 726/1 |
| 2010/0205292 | A1* | 8/2010 | Diaz ................. | H04L 12/40013 709/224 |
| 2010/0228919 | A1* | 9/2010 | Stabrawa .......... | G06F 11/1456 711/120 |
| 2011/0208931 | A1* | 8/2011 | Pendharkar ....... | G06F 3/0608 711/162 |
| 2011/0289290 | A1* | 11/2011 | Akirav .............. | G06F 11/1453 711/162 |

(Continued)

*Primary Examiner* — Imad Hussain
(74) *Attorney, Agent, or Firm* — Griffiths & Seaton PLLC (57) ABSTRACT

For enhancing data replication in a complex computer storage network by a computer processor device, data usage analytics, in conjunction with historical data transfer patterns, are used to generate predictive assumptions of storage resources in the complex storage network such that the storage resources are allocated and released commensurately with availability of the complex storage network to facilitate efficient data replication across the complex storage network.

18 Claims, 5 Drawing Sheets

(56) References Cited

U.S. PATENT DOCUMENTS

| | | | |
|---|---|---|---|
| 2012/0079326 A1* | 3/2012 | Riegel | G06F 11/008 714/38.1 |
| 2013/0047140 A1* | 2/2013 | Shann | G06F 11/3664 717/128 |
| 2013/0080641 A1* | 3/2013 | Lui | H04L 67/10 709/226 |
| 2014/0089449 A1* | 3/2014 | Bhogal | H04L 67/06 709/213 |
| 2015/0326481 A1* | 11/2015 | Rector | H04L 47/14 370/236 |

* cited by examiner

PREDICTIVE DATA REPLICATION AND ACCELERATION

BACKGROUND OF THE INVENTION

Field of the Invention

The present invention relates in general computing systems, and more particularly to, various embodiments for predictive data replication and acceleration in data storage environments.

Description of the Related Art

Today with modern technology, large volumes of data are storable on disk drives and other storage media; these drives can exist as a solo entity, or as part of a broader make up within a larger storage environment. For various purposes, data is stored locally and may be replicated to a remote destination. Data transfer between disparate physical locations serves, among other purposes, to add redundancy and security to the data by placing a copy of the data in a disparate location should the data at the original storage location become corrupt or otherwise lost.

SUMMARY OF THE INVENTION

While providing attendant benefits, data transfers between disparate locations may place an enormous burden on a particular organization's network infrastructure. This has traditionally resulted in long transfer times as the network is subjected to increasing congestion, which delay network operations. A number of different solutions have helped to mitigate this challenge. However, throughput remains limited to the bandwidth network architecture in use, and attempts to mitigate the challenge of longer transfer times have not addressed these constraints.

Current methodologies to mitigate transfer delays are generally based upon the concept of maximizing throughput when the data transfers are initiated. Correspondingly, these methodologies are inherently limited to the physical architecture of the connectivity itself. The connection capacity of a particular network may, however, be underutilized a large percentage of the time. Accordingly, considerations of throughput may not be as important as the maximization of full bandwidth when data is in transit. Current methodologies treat data transfers as a command controlled-based function. In other words, the system is commanded/controlled to perform a data transfer function; however the system is constrained by the resources that are available at the time the data transfer occurs.

In view of the foregoing, a need exists for a predictive mechanism to better address storage network resources in view of historical transfer patterns in data transfers. Accordingly, various embodiments for enhancing data replication in a complex computer storage network by a computer processor device are provided. In one embodiment, by way of example only, a method for enhancing data replication in a complex computer storage network by a computer processor device is provided. Data usage analytics are used in conjunction with historical data transfer patterns to generate predictive assumptions of storage resources in the complex storage network such that the storage resources are allocated and released commensurately with availability of the complex storage network to facilitate efficient data replication across the complex storage network.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, while providing attendant benefits, data transfers between disparate locations may place an enormous burden on a particular organization's network infrastructure. The movement of a large amount of data between sites has traditionally resulted in long transfer times as the network is subjected to increasing congestion, which delay network operations among other challenges. A number of different solutions have helped to mitigate this challenge. However, throughput remains limited to the bandwidth network architecture in use, and attempts to mitigate the challenge of longer transfer times have not addressed these constraints.

Current methodologies to mitigate transfer delays are generally based upon the concept of maximizing throughput when the data transfers are initiated. Correspondingly, these methodologies are inherently limited to the physical architecture of the connectivity itself. The connection capacity of a particular network may, however, be underutilized a large percentage of the time. Accordingly, considerations of throughput may not be as important as the maximization of full bandwidth when data is in transit. Current methodologies treat data transfers as a command controlled-based function. In other words, the system is commanded/controlled to perform a data transfer function; however the system is constrained by the resources that are available at the time the data transfer occurs. A need exists for alternative solutions to the existing command controlled-based nature attendant to traditional data replicative functionality.

The mechanisms of the illustrated embodiments provide, among other benefits, methods of predicting a user (and thereby the data replication system)'s needs in terms of data replication and transfer between sites, by, for example, utilizing analytics combined with historical transfer patterns, and leveraging scratch space available at the remote location, as will be further described. The scratch space may either be sourced from a user allocation, or tightly integrated with storage arrays to utilize existing spare capacity within the storage array.

The mechanisms of the illustrated embodiments utilize low-bandwidth priorities to ensure that impact on production data transfers is minimized. In addition, bandwidth and storage capacity is intelligently released based upon the particular environment, again as will be described.

Figure 1:
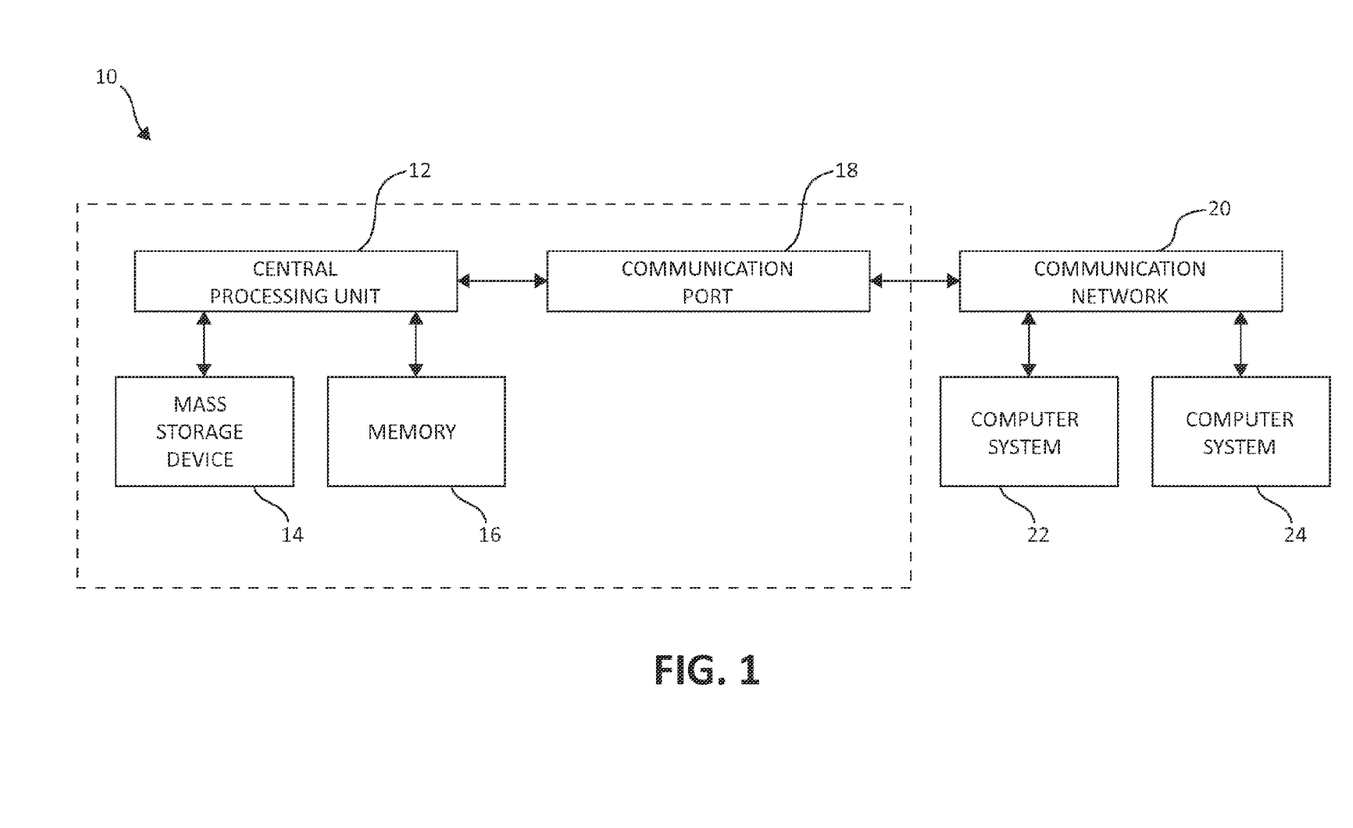
FIG. 1 is an exemplary block diagram showing a hardware structure for performing predictive data replication functionality, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
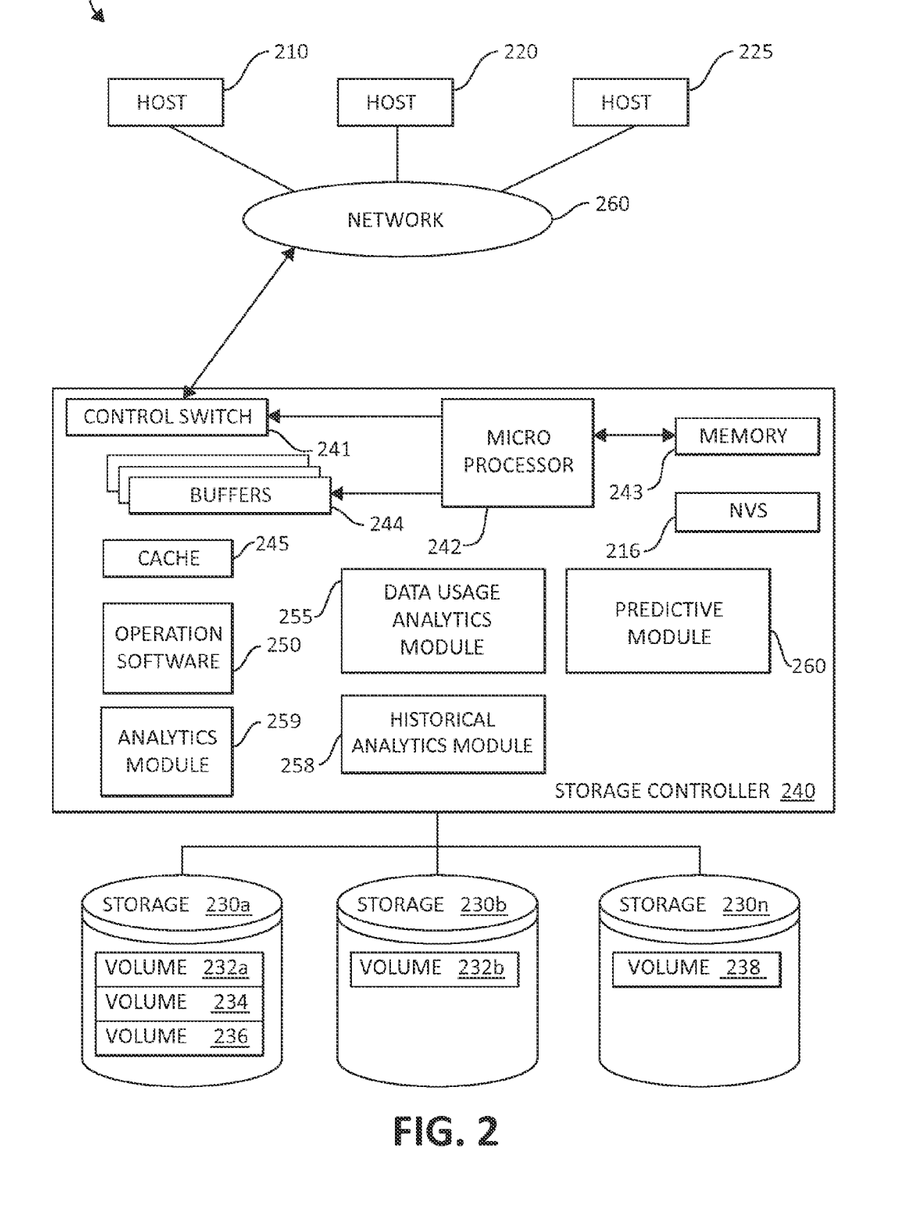
FIG. 2 is an exemplary block diagram showing a hardware structure of a data storage system in a computer system, again in which aspects of the present invention may be realized.

FIG. 2 is an exemplary block diagram 200 showing a hardware structure of a data storage and replication system that may be used in the overall context of performing data replication functionality. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data usage analytics module 255, a historical analytics module 258, and a predictive module 260. The data usage analytics module 255, historical analytics module 258, and predictive module 260 may operate in conjunction with each and every component of the storage controller 240, the hosts 210, 220, 225, and storage devices 230. The data usage analytics module 255, historical analytics module 258, and predictive module 260 may be structurally one complete module or may be associated and/or included with other individual modules. The data usage analytics module 255, historical analytics module 258, and predictive module 260 may also be located in the cache 245 or other components.

The data usage analytics module 255, historical analytics module 258, and predictive module 260 may individually and/or collectively perform various aspects of the present invention as will be further described. For example, the data usage analytics module 255 may apply analytics to measurements of data usage to identify trends of data replication or other characteristics. Similarly, the historical analytics module 258 may apply analytics to historical observations of data storage, transfer, and replicative activity occurring in the storage network. Predictive module 260 may analyze results obtained from the data usage analytics module 255 and/or the historical analytics module 258 to form generalizations of how specific data is transferred and replicated through the system.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data usage analytics module 255, historical analytics module 258, and predictive module 260, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
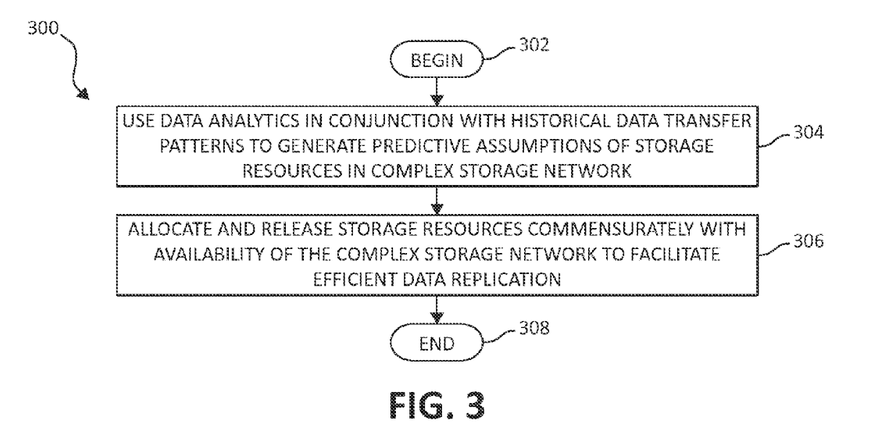
FIG. 3 is a flow chart diagram illustrating an exemplary method for enhancing data replication, again in which aspects of the present invention may be realized.

Turning now to FIG. 3, a flow chart diagram, illustrating an exemplary method 300 for enhancing data replication in complex storage networks, is depicted. Method 300 begins (step 302). Data analytics, in conjunction with historical data transfer patterns, are utilized to generate predictive assumptions of storage resources in the complex storage network (step 304). Consequently, the storage resources are allocated and released commensurately with an availability of the complex storage network to facilitate efficient data replication (step 306). The method 300 then ends (step 308).

Various computing and processing entities, such as the data usage analytics module 255 and historical analytics module 258 may consider a variety of factors to effect predictive functionality in a data replication system, along with an intelligent allocation and release of various storage networks in the complex storage network. Some of these mechanisms of consideration will be further described in several exemplary embodiments, following.

Figure 4A:
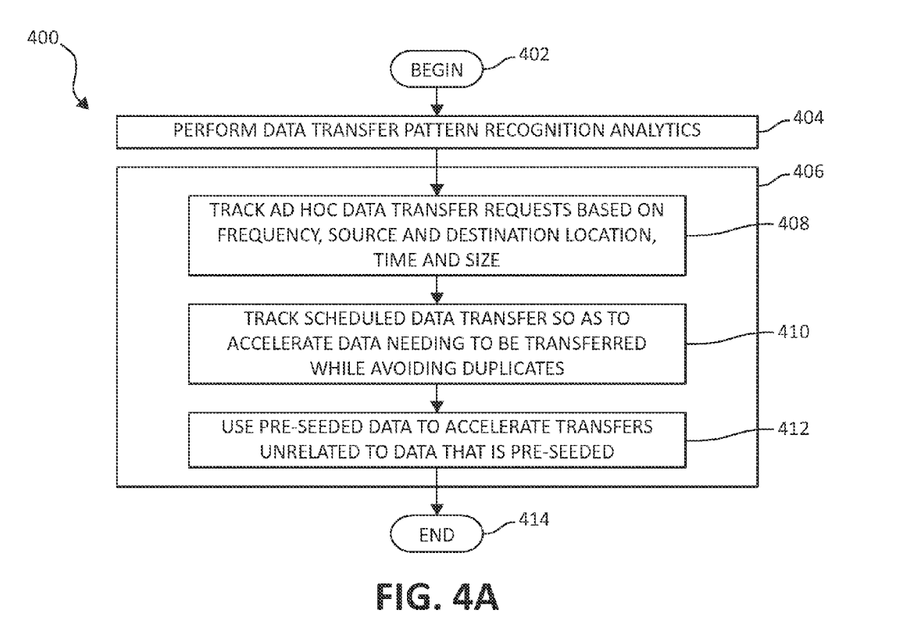
FIG. 4A is an additional flow chart diagram illustrating an additional exemplary method for enhancing data replication, here showing an exemplary implementation of data transfer pattern recognition analytics.

First, turning to FIG. 4A, an exemplary method 400 for performing various data transfer pattern recognition analytics is depicted. The transfer pattern recognition analytics may be used in conjunction with subsequent functionality to be described in succeeding figures as will be described. Method 400 begins (step 402). Method 400 performs various data transfer pattern recognition analytics, and then, based upon the information gathered from the performed analytics, generates data transfer predictions and facilitates background data transfers of the data (step 404).

Inclusive of the data transfer pattern recognition analytics are several subsets 406 of possible analysis as follows. First, those ad hoc data transfer requests in the complex network may be tracked. The request tracking may be based on a variety of factors, including frequency, source and destination location, time, and size (step 408).

Scheduled data transfers may also be tracked, so as to facilitate with acceleration that which must be transferred. In addition, the scheduled data transfers may be scheduled so as to avoid duplicate data transfer operations (step 410). As a next step, by leveraging deduplication technologies already integrated into various hardware in the complex network, pre-seeding data may be useful for accelerating transfers that are unrelated to the data that is pre-seeded (step 410). The pre-seeded data may be tracked to determine its percentage of predictive success. The method 400 then ends (step 414).

Figure 4B:
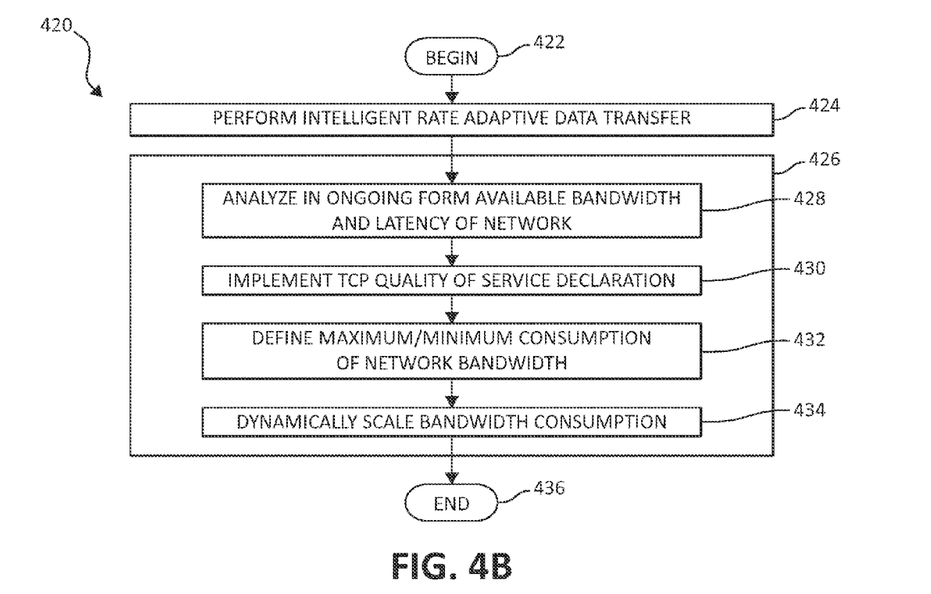
FIG. 4B is an additional flow chart diagram illustrating an additional exemplary method for enhancing data replication, here showing an exemplary implementation of intelligent, rate-adaptive data transfer.

Turning now to FIG. 4B, and in conjunction with the data transfer pattern recognition analytics shown in FIG. 4A, previously, method 420 depicts exemplary mechanisms for performing intelligent, rate-adaptive data transfer in the complex storage environment. Method 420 begins (step 422). Here, as in FIG. 4A, previously, various subsets 426 of functionality for performing intelligent, rate-adaptive data transfer operations (step 424) may be completed, either in tandem or singularly depending on a particular scenario.

An ongoing analysis, in various forms (network-wide, nodes, etc.) of available bandwidth may be performed. In addition, various latency measurements may also be taken and analyzed on an ongoing basis (step 428). If available, the Transport Control Protocol (TCP) quality of service declarations may be implemented to set low priority (step 430). A maximum/minimum consumption of network bandwidth may be definable/defined for the network (step 432). In addition, the applicable bandwidth consumption may be subject to dynamic scaling so as to avoid impact on critical services. The method 420 ends (step 436).

Figure 4C:
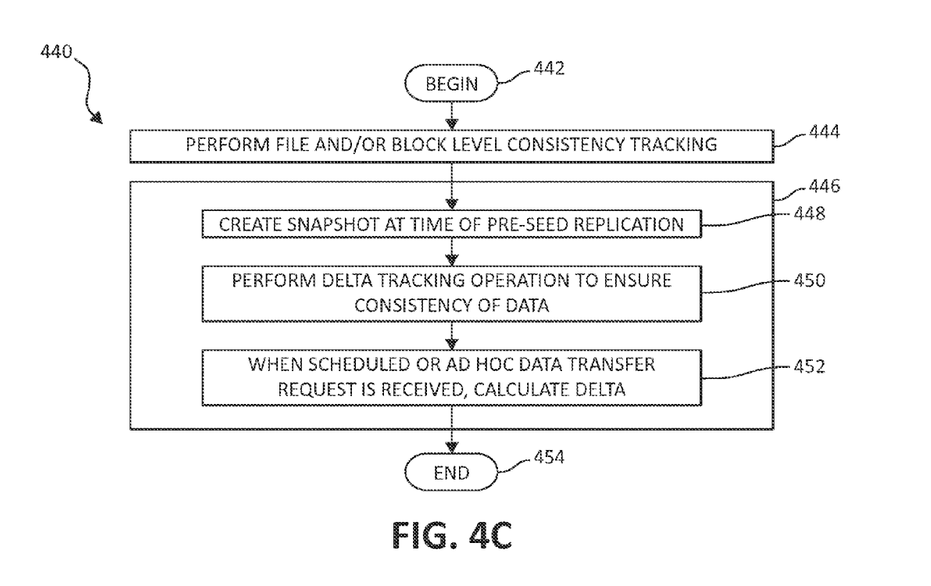
FIG. 4C is an additional flow chart diagram illustrating an additional exemplary method for enhancing data replication, here showing an exemplary implementation of file and/or block-level consistency tracking.

FIG. 4C, following, illustrates additional data replication enhancement functionality, here embodied as file and/or block-level consistency tracking as method 440. Method 440 begins (step 442). Again, various subsets 446 of the consistency tracking (step 444) may be implemented. First, a snapshot may be created at a time of pre-seed replication (step 448). A delta tracking operation may be then performed to ensure consistency of data upon completion of a data transfer operation (step 450). When scheduled or ad hoc data transfer requests are received, a delta operation may be performed and the delta calculated (step 452). This delta may then be transferred with production data transfer priorities.

Ad hoc and scheduled data transfer requests may be implemented on a per-volume or per-consistency group basis. In one embodiment, due to the manner in which delta calculations are performed, pre-seeded data may not require the formation of consistency groups. The method 440 ends (step 454).

Figure 4D:
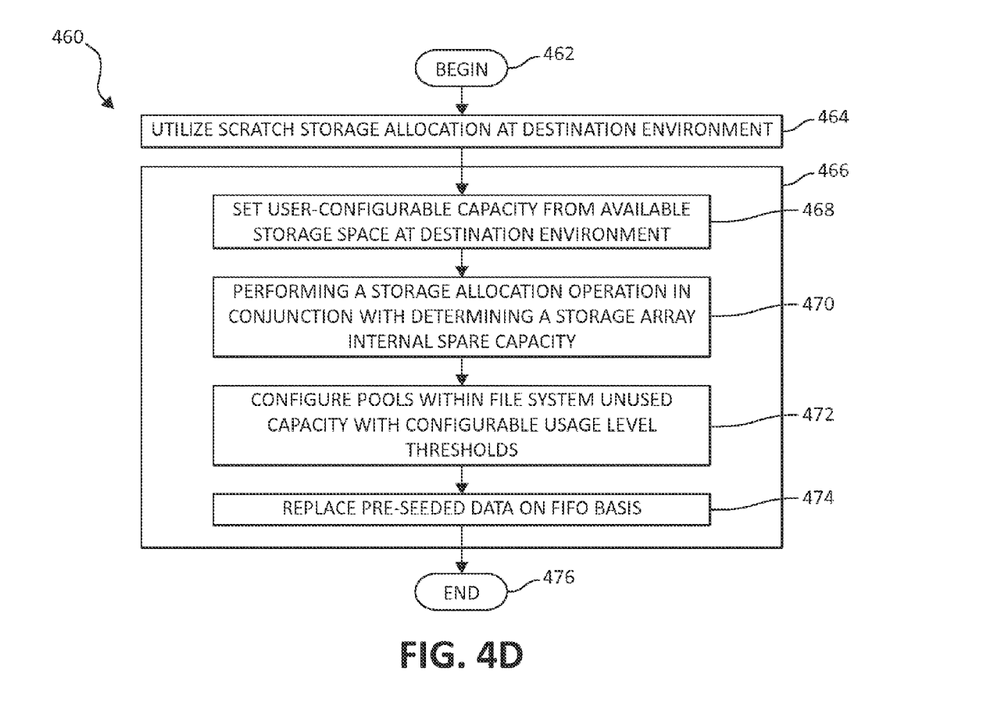
FIG. 4D is an additional flow chart diagram illustrating an additional exemplary method for enhancing data replication, here showing exemplary scratch storage allocation utilization.

FIG. 4D, following, illustrates yet additional data replication enhancement functionality, here embodied as the utilization of scratch storage allocation at a destination environment/remote storage location in method 460. Method 460 begins (step 464). The various subset 466 functionality of scratch storage utilization may include setting a user-configurable capacity from available storage space determined to exist at the destination environment (step 468). A storage allocation operation may then be performed in conjunction with determining a storage array internal spare capacity (step 470). This allocation may be quickly vacated upon an array request, allowing the storage resources to be allocated and released commensurately with the replicative needs in the storage environment.

Continuing the functionality of method 460, pools within the file system's unused capacity may be configured with configurable usage-level thresholds (step 472). Pre-seeded data may be replaced on a First-In, First-Out (FIFO) basis, by, for example, using an intelligent aging process based upon a data usage frequency. The method 460 ends (step 476).

It will be appreciated that the various mechanisms described in FIGS. 4A-4D may work individually, or in concert, or in a predefined combination, such that objectives of dynamic bandwidth and storage resource allocation in a particular complex storage environment may be effected. Each of the aforementioned mechanisms may assist in predictably configuring storage resources to suit a particular application at a particular time. The predictive and time-based use of storage resources, coupled with the utilization of scratch storage space in the destination environment, allows for effective management of data replication, and may accelerate replicative operations that have traditionally been slowed by resource, bandwidth, and other constraints. One of ordinary skill in the art will appreciate that variations to the exemplary functionality may also be implemented so as to further a particular replicative objective.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for enhancing data replication in a complex computer storage network by a computer processor device, comprising:
   using data usage analytics in conjunction with historical data transfer patterns to generate predictive assumptions of storage resources in the complex storage network such that the storage resources are allocated and released commensurately with availability of the complex storage network to facilitate efficient data replication across the complex storage network; and
   performing one of file and block-level consistency tracking by:
      creating a snapshot at a time of pre-seed data replication,
      performing a delta tracking operation to ensure data consistency upon completion of data transfer,
      upon a scheduled or ad hoc data transfer request, performing a delta calculation in accordance with a production data transfer priority, and
      implementing the scheduled or ad hoc data transfer request on one of a per-volume and consistency group basis.

2. The method of claim 1, further including leveraging scratch space available at a remote storage location to utilize an existing spare storage capacity within the complex storage network.

3. The method of claim 1, further including performing one of:
   tracking an ad hoc data transfer request based upon at least one of a frequency, source and destination location, time, and size,
   tracking a scheduled data transfer so as to accelerate data needing to be transferred while avoiding duplicate data transfers, and
   using pre-seeded data for accelerating transfers that are unrelated to data that is pre-seeded.

4. The method of claim 1, wherein facilitation of efficient data replication across the complex storage network further includes implementing background data transfers based on the data usage analytics and the historical data transfer patterns.

5. The method of claim 1, further including tracking pre-seeded data to determine a percentage of predictive success.

6. The method of claim 2, wherein leveraging scratch storage space available at the remote storage location further includes performing one of:
   allowing, by a user, configurable storage capacity from user available storage space at the remote storage location,
   integrating the leveraging into an internal storage array spare capacity, the storage array spare capacity vacated upon an array request,
   configuring at least one pool within a file system unused capacity with a configurable usage level threshold, and
   replacing pre-seeded data on a first-in, first-out (FIFO) basis while implementing an aging program against the data based at least in part on a usage frequency.

7. A system for enhancing data replication in a complex computer storage network, comprising:
   a processor, operational in the computer storage network, that uses data usage analytics in conjunction with historical data transfer patterns to generate predictive assumptions of storage resources in the complex storage network such that the storage resources are allocated and released commensurately with availability of the complex storage network to facilitate efficient data replication across the complex storage network; and
   performs one of file and block-level consistency tracking by:
      creating a snapshot at a time of pre-seed data replication,
      performing a delta tracking operation to ensure data consistency upon completion of data transfer,
      upon a scheduled or ad hoc data transfer request, performing a delta calculation in accordance with a production data transfer priority, and
      implementing the scheduled or ad hoc data transfer request on one of a per-volume and consistency group basis.

8. The system of claim 7, wherein the processor leverages scratch space available at a remote storage location to utilize an existing spare storage capacity within the complex storage network.

9. The system of claim 7, wherein the processor performs one of:
- tracking an ad hoc data transfer request based upon at least one of a frequency, source and destination location, time, and size,
- tracking a scheduled data transfer so as to accelerate data needing to be transferred while avoiding duplicate data transfers, and
- using pre-seeded data for accelerating transfers that are unrelated to data that is pre-seeded.

10. The system of claim 7, wherein the processor, pursuant to facilitation of efficient data replication across the complex storage network, implements background data transfers based on the data usage analytics and the historical data transfer patterns.

11. The system of claim 7, wherein the processor tracks pre-seeded data to determine a percentage of predictive success.

12. The system of claim 8, wherein the processor, pursuant to leveraging scratch storage space available at the remote storage location, performs one of:
- allowing, by a user, configurable storage capacity from user available storage space at the remote storage location,
- integrating the leveraging into an internal storage array spare capacity, the storage array spare capacity vacated upon an array request,
- configuring at least one pool within a file system unused capacity with a configurable usage level threshold, and
- replacing pre-seeded data on a first-in, first-out (FIFO) basis while implementing an aging program against the data based at least in part on a usage frequency.

13. A computer program product for enhancing data replication in a complex computer storage network by a processor device, the computer program product comprising a non-transitory computer-readable storage medium having computer-readable program code portions stored therein, the computer-readable program code portions comprising:
- a first executable portion that uses data usage analytics in conjunction with historical data transfer patterns to generate predictive assumptions of storage resources in the complex storage network such that the storage resources are allocated and released commensurately with availability of the complex storage network to facilitate efficient data replication across the complex storage network; and
- performs one of file and block-level consistency tracking by:
  - creating a snapshot at a time of pre-seed data replication,
  - performing a delta tracking operation to ensure data consistency upon completion of data transfer,
  - upon a scheduled or ad hoc data transfer request, performing a delta calculation in accordance with a production data transfer priority, and
  - implementing the scheduled or ad hoc data transfer request on one of a per-volume and consistency group basis.

14. The computer program product of claim 13, further including a second executable portion that leverages scratch space available at a remote storage location to utilize an existing spare storage capacity within the complex storage network.

15. The computer program product of claim 13, further including a second executable portion that performs one of:
- tracking an ad hoc data transfer request based upon at least one of a frequency, source and destination location, time, and size,
- tracking a scheduled data transfer so as to accelerate data needing to be transferred while avoiding duplicate data transfers, and
- using pre-seeded data for accelerating transfers that are unrelated to data that is pre-seeded.

16. The computer program product of claim 13, further including a second executable portion that, pursuant to facilitation of efficient data replication across the complex storage network, implements background data transfers based on the data usage analytics and the historical data transfer patterns.

17. The computer program product of claim 13, further including a second executable portion that tracks pre-seeded data to determine a percentage of predictive success.

18. The computer program product of claim 14, further including a third executable portion that, pursuant to leveraging scratch storage space available at the remote storage location, performs one of:
- allowing, by a user, configurable storage capacity from user available storage space at the remote storage location,
- integrating the leveraging into an internal storage array spare capacity, the storage array spare capacity vacated upon an array request,
- configuring at least one pool within a file system unused capacity with a configurable usage level threshold, and
- replacing pre-seeded data on a first-in, first-out (FIFO) basis while implementing an aging program against the data based at least in part on a usage frequency.

* * * * *